United States Patent
Konzelmann et al.

(10) Patent No.: US 6,981,411 B2
(45) Date of Patent: Jan. 3, 2006

(54) MEASURING ELEMENT FOR A FLOW RATE SENSOR, IN PARTICULAR AN AIR-MASS FLOWSENSOR FOR INTERNAL COMBUSTION ENGINES

(75) Inventors: Uwe Konzelmann, Asperg (DE); Tobias Lang, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/851,593

(22) Filed: May 21, 2004

(65) Prior Publication Data
US 2004/0255667 A1 Dec. 23, 2004

(30) Foreign Application Priority Data
May 21, 2003 (DE) ............... 103 24 292

(51) Int. Cl.
*G01F 1/68* (2006.01)

(52) U.S. Cl. ............................. 73/204.26
(58) Field of Classification Search . 73/204.11–204.26
See application file for complete search history.

(56) References Cited

U.S. PATENT DOCUMENTS

| | | | | |
|---|---|---|---|---|
| 4,884,443 A | * | 12/1989 | Lee et al. | 73/204.16 |
| 6,840,102 B2 | * | 1/2005 | Kouno | 73/204.15 |
| 2004/0261521 A1 | * | 12/2004 | Hecht et al. | 73/204.26 |

FOREIGN PATENT DOCUMENTS

EP   0 955 524   11/1999

* cited by examiner

Primary Examiner—Harshad Patel
(74) Attorney, Agent, or Firm—Kenyon & Kenyon

(57) ABSTRACT

A measuring element for a flow rate sensor is described, in which the number of terminals is minimized to reduce the dimensions of the measuring element.

18 Claims, 2 Drawing Sheets

MEASURING ELEMENT FOR A FLOW RATE SENSOR, IN PARTICULAR AN AIR-MASS FLOWSENSOR FOR INTERNAL COMBUSTION ENGINES

BACKGROUND INFORMATION

A flow rate sensor for determining the air mass taken in by an internal combustion engine having two heating resistors and two reference temperature sensors is discussed in European Published Patent Application No. 0 955 524. Prior to the air flowing over the heating resistors, the temperature of the air flowing past the flow rate sensor is detected by the reference temperature sensors. Both heating resistors are used for measuring the air mass flowing over the flow rate sensor. The effect of the first heating resistor in the flow direction heating the air flowing over it is utilized here, which results in the second heating resistor in the flow direction needing less heating energy than the first heating resistor to reach a predefined temperature. The cooling of the first heating resistor in the flow direction results in reduced electrical resistance of this heating resistor, while the second heating resistor is only slightly cooled by the air heated by the first heating resistor, so that the electrical resistance of the second heating resistor, under what are otherwise the same starting conditions, is greater than the electrical resistance of the first heating resistor. From the difference of the temperature-dependent resistances of the first heating resistor and the second heating resistor or from the difference of the necessary for maintaining constant (excess) temperatures, conclusions are drawn with regard to the air mass flowing past the flow rate sensor.

It is further known that a temperature sensor may be assigned to each heating resistor to be used for measuring the temperature of the heating resistor.

This circuit system is thus made up of two heating resistors, two temperature sensors, and two reference temperature sensors having a total of 2 times 6=12 terminals. If these 12 terminals are to be accommodated on a chip, the size of the chip, among other things, is predetermined by the number of terminals. The costs of a chip, among other things, also depend on its size.

SUMMARY OF THE INVENTION

In a measuring element for a flow rate sensor according to the present invention, having a ground terminal and five additional terminals, and a reference temperature sensor for determining the ambient temperature, the reference temperature sensor being electrically connected to the ground terminal and the first terminal, having a first heating resistor, the first heating resistor being electrically connected to the ground terminal and the second terminal, having a first temperature sensor, the first temperature sensor being electrically connected to the ground terminal and the third terminal, having a second heating resistor, the second heating resistor being electrically connected to the ground terminal and the sixth terminal, and having a second temperature sensor, the second temperature sensor being electrically connected to the ground terminal and the fifth terminal; the number of terminals may be reduced to six so that the size of the chip on which the measuring element according to the present invention is situated and thus the manufacturing costs may be substantially reduced.

The reference temperature sensor and the first temperature sensor are advantageously part of a bridge circuit, a Wheatstone bridge in particular. It is likewise advantageous if the reference temperature sensor and the second temperature sensor are part of a bridge circuit, a Wheatstone bridge in particular. Due to the fact that the reference temperature sensor is used in both the first bridge circuit and the second bridge circuit, the number of electrical components and terminals may be reduced without compromising the functionality of the measuring element according to the present invention.

Furthermore, it has been found to be advantageous if a first bridge voltage is applied between the first terminal and the third terminal and the voltage applied to the first heating resistor is regulated as a function of the first bridge voltage.

In a similar manner it is advantageous if a second bridge voltage is applied between the first terminal and the fifth terminal and the voltage applied to the second heating resistor is regulated as a function of the second bridge voltage.

Difference amplifiers may be advantageously used for regulating the voltage applied to the first heating resistor and the second heating resistor; the bridge voltages may be adjusted via the offset voltage of the difference amplifiers or via the bridge resistors.

In an advantageous embodiment of the present invention, the reference temperature sensor may be composed of a first partial resistor and a second partial resistor connected thereto in series.

The operating mode of the measuring element according to the present invention is further improved if the temperature sensors have a much greater resistance than the heating resistors.

The manufacture of the measuring element according to the present invention is simplified if the measuring element has a substrate on which a resistive layer is situated, the heating resistors and the temperature sensors being structured out of this layer. The leads for contacting and connecting the heating resistors and the temperature sensors may simultaneously be structured out of the resistive layer.

DETAILED DESCRIPTION

Figure 1:
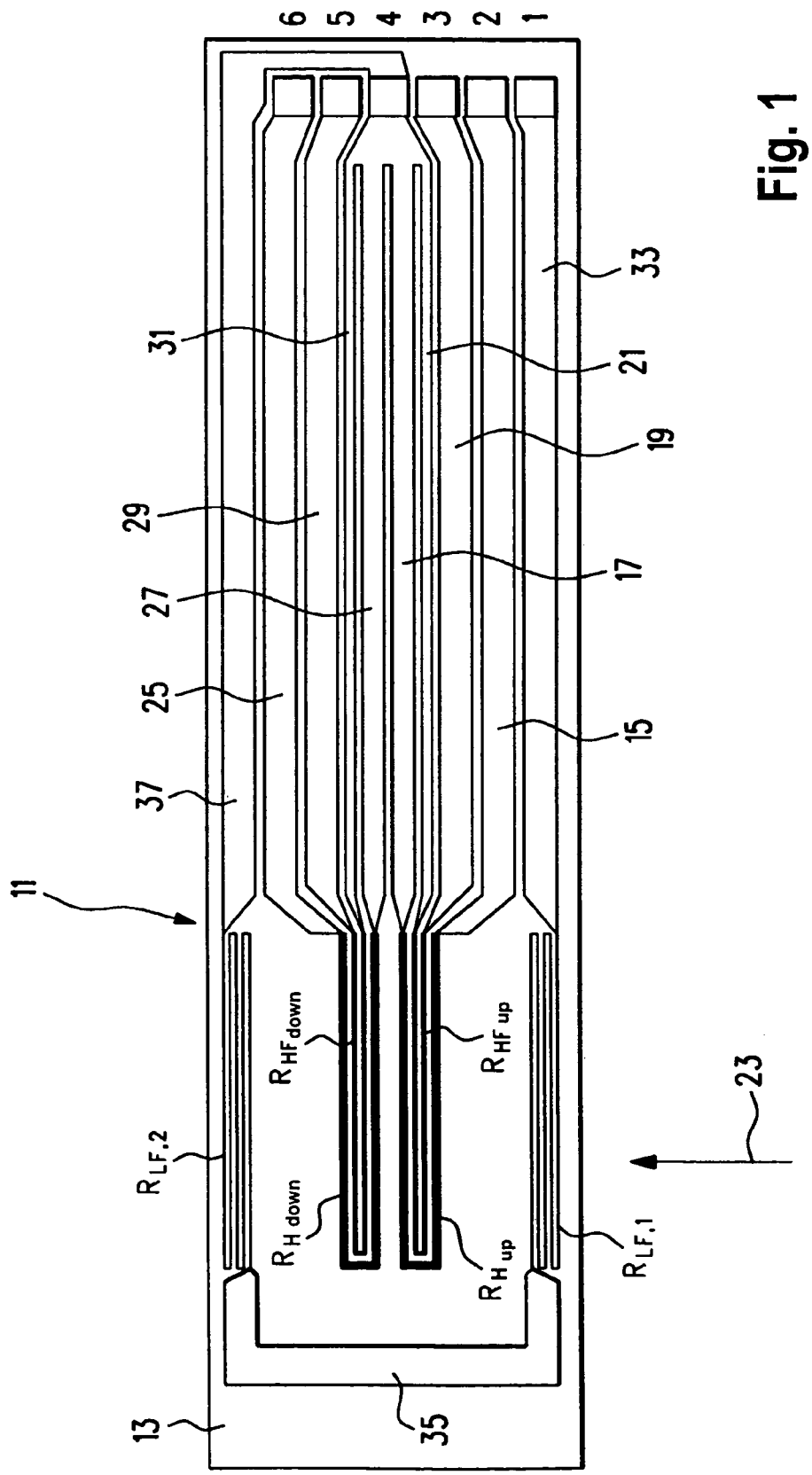
FIG. 1 shows the layout of a measuring element according to the present invention.

FIG. 1 shows a chip 11 on which the measuring element according to the present invention is situated. Measuring element 11 is part of the flow rate sensor circuit shown in FIG. 2. The integration of measuring element 11 into the flow rate sensor circuit is explained in greater detail below based upon FIG. 2.

First it should be noted that measuring element 11 is designed as a chip which in turn is made up of a substrate 13 on which a resistive layer is applied. The components of measuring element 11, described in detail below, are etched out of this resistive layer.

Measuring element 11 has a ground terminal 4 to which all components situated on substrate 13 are connected.

A first U-shaped heating resistor $R_{H,up}$ is electrically connected to third terminal 3 via a printed conductor 15 and to ground terminal 4 via a printed conductor 17. A first temperature sensor $R_{HF,up}$ is situated within first heating resistor $R_{H,up}$. First temperature sensor $R_{HF,up}$ is electrically connected to third terminal 3 via a printed conductor 19 and to ground terminal 4 via a printed conductor 21.

The flow direction of the air flowing over measuring element 11 whose mass flow is to be measured is indicated in FIG. 1 by an arrow 23.

A second heating resistor $R_{H,down}$ and a second temperature sensor $R_{HF,down}$ are situated downstream from first heating resistor $R_{HF,down}$. Second heating resistor $R_{H,down}$ is electrically connected to sixth terminal 6 via a printed connector 25 and to ground terminal 4 via a printed conductor 27.

Second temperature sensor $R_{HF,down}$ is electrically connected to terminal 5 via a printed conductor 29 and to ground terminal 4 via a printed conductor 31.

To prevent mutual interference of the temperature regulations of first heating resistor $R_{H,up}$ and second heating resistor $R_{H,down}$, printed conductors 21, 17, 27, and 31, which all end at ground terminal 4, are designed as separate printed conductors as close as possible to ground terminal 4.

Finally, measuring element 11 also includes a reference temperature sensor $R_{LF}$ which, according to the exemplary embodiment in FIG. 1, is made up of two partial resistors $R_{LF,1}$ and $R_{LF,2}$ which are connected in series. Partial resistors $R_{LF,1}$ and $R_{LF,2}$ are electrically connected to first terminal 1 and ground terminal 4 via printed conductors 33, 35, and 37.

Of course, reference temperature sensor $R_{LF}$ may also be made up of a resistor (not shown) which may be positioned, for example, where printed conductor 35 is situated now on substrate 13.

The integration of measuring element 11 into the electric circuit of a flow rate sensor is illustrated and explained in the following based upon FIG. 2. The symbols used for the identification of the components of the measuring element in FIG. 1 have been used for the diagram in FIG. 2. The same is true for the symbols identifying electrical terminals 1 through 6.

Figure 2:
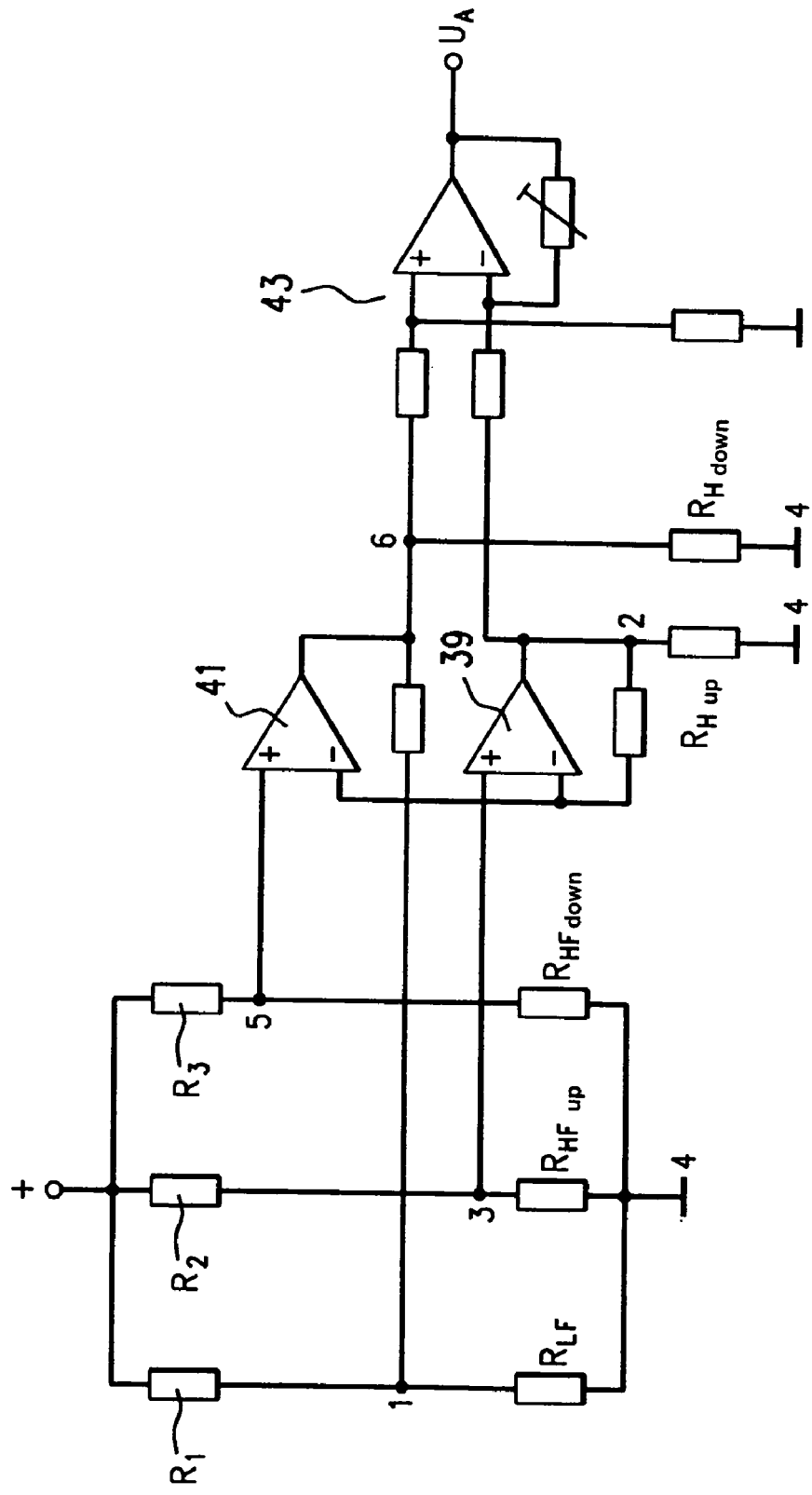
FIG. 2 shows the diagram of a flow rate sensor including a measuring element according to the present invention.

As can be seen in FIG. 2, temperature sensor $R_{LF}$ and first heating resistor $R_{HF,up}$ together with a first bridge resistor $R_1$ and a second bridge resistor form a first Wheatstone bridge whose bridge voltage is applied between terminals 1 and 3. This bridge voltage is supplied to a first difference amplifier 39 as an input voltage. The output voltage of first difference amplifier 39 is used for regulating the voltage applied to first heating resistor $R_{H,up}$ and is thus used for regulating the temperature of first heating resistor $R_{H,up}$.

Reference temperature sensor $R_{LF}$ and second temperature sensor $R_{HF,down}$ together with first bridge resistor $R_1$ and a third bridge resistor $R_3$ form a second Wheatstone bridge. The bridge voltage of this second Wheatstone bridge is applied to terminals 1 and 5 of measuring element 11 (see FIG. 1). This second bridge voltage is supplied to a second difference amplifier 41 as an input voltage. The output voltage of second difference amplifier 41 is used for regulating the power output of second heating resistor $R_{H,down}$. The output voltage of second difference amplifier 41 is applied between terminals 6 and 4 of measuring element 11.

The output voltages of first difference amplifier 39 and second difference amplifier 41 are supplied to a subtraction element 43 which generates an output voltage $U_A$ of the flow rate sensor therefrom. This output voltage $U_A$ represents the output signal of the flow rate sensor.

The first circuit bridge and the second circuit bridge may be adjusted via the adjustable offset voltages of first difference amplifier 39 and second difference amplifier 41.

Alternative adjustments may be performed by varying the resistances of bridge resistors $R_1$, $R_2$, and $R_3$.

What is claimed is:

1. A measuring element for a flow rate sensor, comprising:
   a ground terminal;
   five additional terminals;
   a reference temperature sensor for determining the ambient temperature, the reference temperature sensor being directly and electrically connected to the ground terminal and electrically connected to a first one of the five additional terminals;
   a first heating resistor directly and electrically connected to the ground terminal and electrically connected to a second one of the five additional terminals;
   a first temperature sensor directly and electrically connected to the ground terminal and electrically connected to a third one of the five additional terminals;
   a second heating resistor directly and electrically connected to the ground terminal and electrically connected to a fourth one of the five additional terminals; and
   a second temperature sensor directly and electrically connected to the ground terminal and electrically connected to a fifth one of the five additional terminals.

2. The measuring element as recited in claim 1, wherein:
   the reference temperature sensor and the first temperature sensor are part of a bridge circuit.

3. The measuring element as recited in claim 2, wherein:
   the bridge circuit includes a Wheatstone bridge.

4. The measuring element as recited in claim 1, wherein:
   the reference temperature sensor and the second temperature sensor are part of a bridge circuit.

5. The measuring element as recited in claim 4, wherein:
   the bridge circuit includes a Wheatstone bridge.

6. The measuring element as recited in claim 1, wherein:
   a first bridge voltage is applied between the first terminal and the third terminal.

7. The measuring element as recited in claim 6, wherein:
   a voltage applied to the first heating resistor is regulated as a function of the first bridge voltage.

8. The measuring element as recited in claim 1, wherein:
   a second bridge voltage is applied between the first terminal and the fifth terminal.

9. The measuring element as recited in claim 8, wherein:
   a voltage applied to the second heating resistor is regulated as a function of the second bridge voltage.

10. The measuring element as recited in claim 1, further comprising:
    a differential amplifier, wherein:
      a regulation of a voltage applied to the first heating resistor and the second heating resistor is controlled by the differential amplifier.

11. The measuring element as recited in claim 10, wherein:
    bridge voltages are adjusted via an offset voltage of the differential amplifier.

12. The measuring element as recited in claim 1, wherein:
    the reference temperature sensor includes a first partial resistor and a second partial resistor connected thereto.

13. The measuring element as recited in claim 1, wherein:
    The reference temperature sensor, the first temperature sensor, and the second temperature sensor have a much greater resistance than the first heating resistor and the second heating resistor.

14. The measuring element as recited in claim 1, further comprising:
    a substrate; and
    a resistive layer situated on the substrate, wherein:
      the reference temperature sensor, the first temperature sensor, the second temperature sensor, the first heating resistor, and the second heating resistor are patterned out of the resistive layer.

15. The measuring element as recited in claim 14, further comprising:
   leads for contacting the reference temperature sensor, the first temperature sensor, the second temperature sensor, the first heating resistor, and the second heating resistor, the leads being patterned out of the resistive layer.

16. The measuring element as recited in claim 1, wherein the measuring element is used for determining an air mass flow ratio in a flow rate sensor.

17. The measuring element as recited in claim 1, wherein the first temperature sensor is arranged within the first heating resistor, and the second temperature sensor is arranged within the second heating resistor.

18. The measuring element as recited in claim 1, wherein the measuring element includes no terminals other than the ground terminal and the five additional terminals.

* * * * *